Patented June 24, 1930

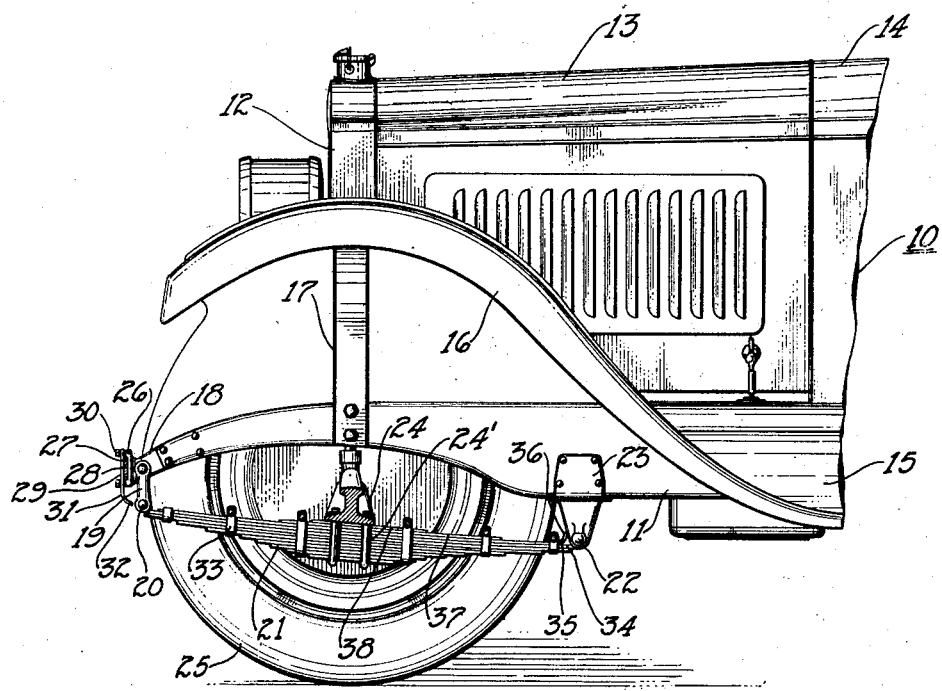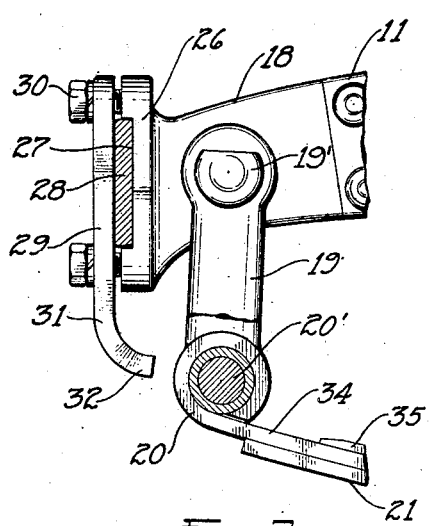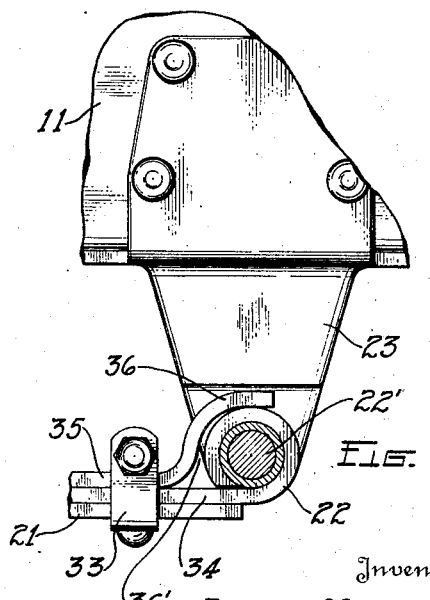

1,766,924

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed October 30, 1926. Serial No. 145,214.

This invention relates to motor vehicles and particularly to the frame, axle, and spring construction.

Since the advent of balloon tires on motor vehicles several years ago a number of changes have been made from conventional practice in regard to the spring connection between the frame and front axle. Most of these changes were designed to overcome front wheel wobble and this has been very materially taken care of by shackling the front springs at the front end instead of at the rear end and slinging the spring under the axle instead of mounting it on top of the axle. By these changes the rear half of the spring has become in effect a radius rod for the axle and the vertical movement of the axle comes very close to the arc of movement of the forward end of the steering drag link so that these vertical movements of the axle do not cause so much lateral wheel movement as was the case with the spring shackle at the rear end.

But this new arrangement of front spring threw a heavier responsibility upon the spring itself. Where formerly the breakage of the rear half of the spring would cause very little shifting of the axle rearwardly, now with the shackle at the front end the axle would shift rearwardly until the front shackle was straightened out, which would be several inches, and this would cause a violent turning of the car towards that side of the road upon which the breakage occurred, and of course with disastrous results at high speed.

One of the objects of the present invention is to provide a spring that will better adapt itself to the radius rod requirement now placed upon it and that will be safeguarded in case of possible breakage.

It has been found that with front end shackled springs excessive rebound acts so differently on the rear end of the spring that conventional spring construction is not sufficient to care for it. Another object of this invention therefore is to so construct the rear end of a front shackled spring that excessive rebound will be amply taken care of and the spring protected from breakage on that account.

Vehicles are now provided with front bumpers supported directly upon the front ends of the frame members. With front spring shackles this brings the shackle and bumper into close proximity. Another object of the invention is to provide a stop or limit piece for the front end of a front shackled spring in conjunction with the mounting of the bumper so that these parts may be cheaply and simply constructed.

Other objects of the invention will appear from the following description taken in connection with the drawings, which form a part of this specification, and in which:

Fig. 1 is a side elevation of the front portion of a motor vehicle with one wheel removed and the axle in section, illustrating one form of the invention;

Fig. 2 is an enlarged detail view of the forward end of the frame and spring connection of the vehicle; and Fig. 3 is an enlarged view of the other end of the frame and spring connection.

Referring to the drawings, 10 represents a motor vehicle comprising a frame 11, a radiator 12 mounted thereon, a cowl 14 and a motor bonnet 13 extending from the radiator to the cowl. There are also shown a splasher 15, fender 16 and a support or bracket 17 for the fender.

The front axle, which is usually the steering axle, is indicated at 24 and it has suitably mounted upon each end thereof a wheel 25 together with the usual steering connections which are not shown in the drawing.

A spring 21 built up of several leaves connected by clips 33, connects the axle with the frame. The spring is preferably under-slung, that is, mounted beneath the axle so that its main leaf 34 rests close to the axle itself. The spring is clamped to the axle as by two or more U-bolts 24'. The outer ends of the spring are connected to brackets 18 and 23 mounted on the frame. At its rear end the main leaf 34 of the spring is formed with an eye 22 through which a pivot bolt 22' passes. This bolt is mounted in the bracket 23 secured to the frame. At its forward end the main leaf 34 of the spring is formed with an eye 20 through which passes a bolt 20' of a spring shackle 19, which shackle is pivoted to the bracket 18 as at 19'. Thus the spring 21 is pivoted at its rear end and shackled at its front end to the frame 11 of the vehicle and the arc of movement of the axle, therefore, is substantially about the pivot 22'. This substantially corresponds to the arc of movement of the drag link of the conventional steering mechanism, as will be understood, and undesirable wheel wobble or "shimmy" is prevented.

This arrangement of spring, however, throws considerable work upon the rear end of the main leaf 34 and particularly on the rebound, that is, the upward movement of the frame relative to the axle after the spring has been compressed, and spring breakage adjacent the eye 22 became more frequent. The main leaf of the spring was of course strengthened at this point in the usual way by extending the next lower leaf substantially out to the eye 22, but it is not practicable to extend an upper leaf in the same way. In the present invention an upper strengthening leaf has been provided as indicated at 35 and this leaf extends through one of the clips 33 and is curved upwardly around the eye 22 of the spring and out of contact therewith until it reaches the top of the eye. This extension of the leaf 35 then flattens out, as shown at 36, where it rests directly on the top of the eye and presses against the eye in its clipped position. Thus this extension 36 does not interfere with the free movement of the spring nor the flexibility of its main leaf 34 except that upon rebound of the frame this extension 36 will reinforce the main leaf 34 and add greatly to the strength of the spring at that point. Also, should the main leaf 34 break as it may do under some unusual conditions, the extension 36 of the leaf 35 will act as a limiting factor to prevent rearward shifting of the axle. Of course with the front end of the spring shackled the axle would normally shift rearwardly upon such breakage, but this is prevented or is limited to the slight clearance indicated at 36' between the upwardly extending part of the leaf 35 and the spring eye 22. This is a great safety factor and is of considerable importance in spring constructions of this type.

It will be noted, also, that the spring 21 is formed with additional reinforcing leaves 37 and 38, both of which are clamped between the main leaf of the spring and the axle. The leaf 37 extends forwardly beyond the second spring clip and rearwardly only to the first spring clip. The leaf 38 extends forwardly through the first spring clip and rearwardly to a point just forward of the axle seat. Thus the rear half of the spring 21 is strengthened both above and below so that it forms a radius rod for the axle at all times.

The bracket 18 at the front end of the frame is formed with an enlargement 26 having a seat 27 for one of the bars of a bumper 28. A plate 29 and bolts 30 secure the bumper 28 in position on the frame. For the purpose of limiting the forward shifting of the spring and axle in case of breakage the plate 29 is provided with a downwardly extending part 31 and a rearwardly extending stop 32 thereon against which the spring eye 20 may abut in case of undue swinging of the spring on the shackle 19.

The greater flexibility of the front end of the spring provides the desired soft spring action while the reinforced rear end of the spring provides for safety and for holding the axle in its desired relative position to prevent lateral wobble. In case of breakage the shifting of the axle is so limited that undue swerving of the vehicle will not result.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with the frame, and a spring shackled to the end of the frame, of a bumper mounted on the frame adjacent the spring shackle, a clamping plate for the bumper, and means on said clamping plate to limit the swinging action of the spring shackle.

2. A spring having a plurality of auxiliary leaves coacting therewith to strengthen the spring, the auxiliary leaves having the greater portion of their length distributed over one end of the spring, and one of the auxiliary leaves engaging one of the eyes of the spring to prevent displacement of the axle upon breakage of the spring.

3. In a motor vehicle, the combination with a frame, a spring supporting the frame and an axle connected to the spring, of a support upon the forward end of the frame, and means upon the support for mounting a bumper and to co-operate with the forward end of the spring to prevent displacement of the axle upon breakage of the spring.

4. In a motor vehicle, the combination with the frame, a spring supporting the frame and an axle connected to the spring, of a stop on the frame adjacent one end of the spring to restrict the movement of the spring and axle in one direction and an auxiliary leaf upon the spring co-operating with the other end of the spring to restrict the movement of the spring and axle in the reverse direction.

5. In a spring structure, the combination with a semi-elliptical spring having a main leaf with an eye upon each end thereof, of a plurality of auxiliary leaves stacked upon the main leaf with the greater portion of their length distributed over one end of the main leaf and one leaf of the stack embracing one of the eyes on the main leaf.

6. In a motor vehicle, in combination with a side bar of a frame, a spring horn at one end of the side bar, a bracket upon the side bar, and a half-elliptic spring having one end shackled to the spring horn and its other end pivoted in the bracket, of a stop upon the spring horn adapted to engage the end of the spring to prevent forward movement upon breakage thereof, and means secured to the spring to engage the pivoted end thereof to prevent backward movement upon breakage.

7. In a motor vehicle, in combination with a side bar of a frame, a spring horn at one end of the side bar, a bracket upon the side bar and a half-elliptic spring having one end shackled to the spring horn and its other end pivoted in the bracket, of a means upon the spring horn for mounting a bumper, said means having an extension adapted to engage the end of the spring upon breakage thereof.

8. In a motor vehicle, in combination with a side bar of a frame, a spring horn at the forward end of the side bar, a bracket upon the side bar, a half-elliptic spring shackled at one end to the spring horn and pivotally connected at its other end to the bracket, of a bumper seat on the spring horn, attaching means for mounting a bumper and an extension on the attaching means to engage the end of the spring upon breakage thereof.

In testimony whereof I affix my signature.

ALFRED MOORHOUSE.